US012589641B2

(12) United States Patent
Ogawa

(10) Patent No.: US 12,589,641 B2
(45) Date of Patent: Mar. 31, 2026

(54) COUPLING STRUCTURE OF DOOR WEATHER STRIP

(71) Applicant: NISHIKAWA RUBBER CO., LTD., Hiroshima (JP)

(72) Inventor: Hirofumi Ogawa, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 0 days.

(21) Appl. No.: 18/828,318

(22) Filed: Sep. 9, 2024

(65) Prior Publication Data

US 2025/0083509 A1      Mar. 13, 2025

(30) Foreign Application Priority Data

Sep. 12, 2023   (JP) ................................. 2023-147673

(51) Int. Cl.
*B60J 10/86*           (2016.01)

(52) U.S. Cl.
CPC ..................................... *B60J 10/86* (2016.02)

(58) Field of Classification Search
CPC ............. B60J 10/21; B60J 10/86; B60J 10/24
See application file for complete search history.

(56) References Cited

U.S. PATENT DOCUMENTS 9,399,392 B2 *   7/2016   Togashi ................... B60J 10/86
9,845,001 B1 *   12/2017   Kojima ................. B60J 5/0402

| | | | |
|---|---|---|---|
| 9,956,858 B2 * | 5/2018 | Sobue ................... | F16J 15/027 |
| 10,081,232 B2 * | 9/2018 | Ogawa ..................... | B60J 10/87 |
| 10,336,169 B2 * | 7/2019 | Kanphade ............... | B60J 10/18 |
| 2006/0162256 A1 * | 7/2006 | Tsuchida ................. | B60J 10/79 49/489.1 |
| 2014/0059940 A1 * | 3/2014 | Eguchi ..................... | B60J 10/21 49/479.1 |

FOREIGN PATENT DOCUMENTS

| | | |
|---|---|---|
| JP | H08282284 A | 10/1996 |
| JP | H09300965 A | 11/1997 |
| JP | H10272929 A | 10/1998 |
| JP | 2004314968 A | 11/2004 |

(Continued)

OTHER PUBLICATIONS

JP2010280285 English translation from WIPO (Year: 2010).*
JP2017087830 English translation from WIPO (Year: 2017).*

*Primary Examiner* — Muhammad Ijaz
*Assistant Examiner* — Susan M. Heschel
(74) *Attorney, Agent, or Firm* — Holtz, Holtz & Volek PC

(57)           ABSTRACT

A door weather strip includes a first extrusion-molded part which couples to an upper side part of a frame of a door of an automobile, a second extrusion-molded part which couples to a vertical side part of the frame, and a die-molded part which connects the first and second extrusion-molded parts on a corner part. A second extended part extends toward a rear part from the die-molded part and has a rigid member embedded. A body of the rigid member has a single anchoring part which is fit in a hole formed on the vertical side part of a frame and a protrusion provided below the anchoring part. The protrusion is flush with the body and extends toward a front part of the automobile body. The protrusion is capable of abutting with an outer part of a second retainer of the door.

1 Claim, 12 Drawing Sheets

(56)          References Cited

FOREIGN PATENT DOCUMENTS

| | | | |
|---|---|---|---|
| JP | 2006327376 | A | 12/2006 |
| JP | 2008247197 | A | 10/2008 |
| JP | 2010221870 | A | 10/2010 |
| JP | 2010280285 | A | * 12/2010 |
| JP | 2017087830 | A | * 5/2017 |
| JP | 2021104723 | A | 7/2021 |

* cited by examiner

III - III

IV-IV up

1004

1001F(1001)

rear

1005

1006

1007

1003  1002 front low

1005

1006a

1006

1007

1006a

COUPLING STRUCTURE OF DOOR WEATHER STRIP

CROSS REFERENCE TO RELATED APPLICATION

This application claims the benefit under 35 USC § 119 of JP Patent Application 2023-147673 filed Sep. 12, 2023, the entire disclosure of which is incorporated herein by reference.

BACKGROUND INFORMATION

The present invention generally relates to a coupling structure of a door weather strip that seals a gap between a peripheral edge of a door opening of an automobile body of an automobile and a door of the automobile. In particular, the invention relates to a structure wherein a rigid member (insert) embedded in a die-molded part of the door weather strip is fixed on the door.

Door weather strips 1001, 2001 illustrated in FIGS. 10 to 12 have been used commonly. The door weather strip 1001 couples to a peripheral edge of a front door 110 of an automobile 100, and the door weather strip 2001 couples to a peripheral edge of a rear door 210, to seal a gap between a peripheral edge of a door opening of an automobile body 105 of the automobile 100 and the doors 110, 210.

The door weather strip 1001 includes two linear parts 1001A and 1001B, which are formed by extrusion molding. The linear parts 1001A and 1001B are joined together on corner parts R1, R2 by die molding. The door weather strip 1001 includes an installation member 1002, a hollow seal member 1003, and a lip 1004. The installation member 1002 couples to the front door 110. The hollow seal member 1003 and the lip 1004 are integrally molded with the installation member 1002 and make elastic contact with the peripheral edge of the door opening. The door weather strip 2001 includes two linear parts 2001A and 2001B, which are formed by extrusion molding. The linear parts 2001A and 2001B are joined together on corner parts R3, R4 by die molding. The door weather strip 2001 includes an installation member, a hollow seal member, and a lip. The installation member couples to the rear door 210. The hollow seal member and the lip are integrally molded with the installation member and make elastic contact with the peripheral edge of the door opening. Detailed explanation about the door weather strip 2001 is omitted hereinafter.

The door weather strip 1001 includes a die-molded part 1001F, which is formed by die molding, on the corner part R1. The die-molded part 1001F has an insert (rigid member) 1005 embedded. The insert 1005 has a tabular shape and includes a clip 1006, which protrudes toward the exterior of the automobile. The door weather strip 1001 couples to the door 110 (210) with the clip 1006 as an anchoring part fit in a hole formed on the door 110 (210) opposite the clip 1006 such that a protuberance 1006a at the top of the clip 1006 anchors to the outside surface of the door 110 (210) (see, for example, Japanese unexamined Patent Publications No. 2010-221870 and No. 2010-280285).

This fixes the die-molded part 1001F on the door 110 (210), to position the die-molded part 1001F relative to the door 110 (210).

Unfortunately, however, the clip 1006 alone fixes the die-molded part 1001F on the door 110 (210). This insufficiently prevents misalignment of the die-molded part 1001F toward the rear part of the automobile body 105.

More specifically, if the first extrusion-molded part 1001A is misaligned toward the rear part relative to the door 110 (210) when the door 110 (210) is opened or closed, the die-molded part 1001F can be misaligned toward the rear part as well. The die-molded part 1001F is fixed on the door 110 (210) by the clip 1006, provided on a second part of the die-molded part 1001F closer to the second extrusion-molded part 1001B, but lacks a direct fixture on a first part closer to the first extrusion-molded part 1001A. This moves, or rotates, an upper side part of the die-molded part 1001F above the position fixed by the clip 1006 (fixed position) toward the rear part and a lower side part of the die-molded part 1001F below the fixed position toward the front part, with the fixed position at the center of rotation. The misalignment of the die-molded part 1001F causes the hollow seal member 1003 and the lip 1004 to make elastic contact with an undesired part of the peripheral edge of the door opening. This leads to abrasion or damage of the door weather strip 1001 due to an unexpected contact or an insufficient sealing performance.

Providing two clips 1006 on a vertical side part of the die-molded part 1001F controls rotation of the insert 1005, to prevent the misalignment of the upper side part of the die-molded part 1001F toward the rear part. But some die-molded parts 1001F have an insufficient space to have the two clips 1006 on the vertical side part.

As illustrated in FIG. 12B, the insert 1005 of Japanese unexamined Patent Publication No. 2010-221870 has a holding wall 1007, which protrudes toward the exterior of the automobile, provided on the upper part. The holding wall 1007 is embedded in the door weather strip 1001 and is used to press an edge of the part of the door weather strip 1001 having the holding wall 1007 continuously against a welded part (illustration omitted) between a roof sash and a pillar sash. The holding wall 1007 enables deformation of the door weather strip 1001 in conformance with the surface profile of the welded part formed on an uneven base or with weld seam, to narrow the space between the welded part and the door weather strip 1001 to the minimum.

Japanese unexamined Patent Publication No. 2010-221870, therefore, fails to prevent the misalignment of die-molded part 1001F toward the rear part relative to the door 110 (210).

To solve the above problems, it is an object of the present invention to provide the coupling structure that prevents misalignment of the door weather strip 1001 relative to the door 110 (210).

SUMMARY OF THE INVENTION

To achieve the above object, an aspect of the present invention provides a coupling structure of a door weather strip (1). The door weather strip (1) includes a first extrusion-molded part (1A), a second extrusion-molded part (1B), and a die-molded part (1F). The first extrusion-molded part (1A) couples to an upper side part (113B) of a frame of a door (110) of an automobile (100). The second extrusion-molded part (1B) couples to a vertical side part (113C) of the frame. The die-molded part (1F) connects the first and second extrusion-molded parts (1A, 1B) on a corner part (R1).

A first part of the die-molded part (1F) closer to the upper side part (113B) includes a first installation member (1FU1), a first hollow seal member (1FU2), a first sub seal lip (1FU4), and a first extended part (1FU4E). The first installation member (1FU1) couples to a first retainer (113BS) of the door (110). The first hollow seal member (1FU2) extends from the first installation member (1FU1) and seals a gap between a peripheral edge (105A) of a door opening of an automobile body (105) of the automobile (100) and the door (110). The first sub seal lip (1FU4) extends from at least one of the first hollow seal member (1FU2) or the first installation member (1FU1) and makes elastic contact with the peripheral edge (105A) of the door opening. The first extended part (1FU4E) extends toward the rear part of the corner part (R1) from the first sub seal lip (1FU4).

A second part of the die-molded part (1F) closer to the vertical side part (113C) includes a second installation member (1FL1), a second hollow seal member (1FL2), a second rear seal lip (1FL3), and a second extended part (1FL4). The second installation member (1FL1) couples to a second retainer (113CR) of the door (110). The second hollow seal member (1FL2) extends from the second installation member (1FL1) and seals a gap between the peripheral edge (105A) of the door opening and the door (110). The second rear seal lip (1FL3) extends from the second installation member (1FL1) and makes elastic contact with the rear surface (113CO) of the vertical side part (113C). The second extended part (1FL4) extends toward the rear part of the corner part (R1) from a connecting part between the second installation member (1FL1) and the second hollow seal member (1FL2) closer to the exterior of the automobile. The lower end of the first extended part (1FU4E) and the upper end of the second extended part (1FL4) are connected. The second extended part (1FL4) has a rigid member (G) embedded.

The rigid member (G) has a tabular shape and includes a body (G1). The body (G1) has a single anchoring part (GC) and a protrusion (G2). The anchoring part (GC) protrudes from the body (G1) of the rigid member (G) and is fit in a hole (113COH) formed on the vertical side part (113C). The protrusion (G2) is provided below the anchoring part (GC). The protrusion (G2) is flush with the body (G1) and extends toward the front part of the automobile body (105). The protrusion (G2) is capable of abutting with the outer part (113CRO) of the second retainer (113CR).

In addition, the second rear seal lip (1FL3) has a thick part (1FL3N) provided below the anchoring part (GC), which protrudes from the body (G1) of the rigid member (G). The thick part (1FL3N) is provided close to the outer part (113CRO) of the second retainer (113CR), and is capable of making elastic contact with the outer part (113CRO).

In addition, the thick part (1FL3N) is formed by die molding and covers the protrusion (G2) from the front side part.

Symbols in parentheses show constituents or items corresponding to the drawings.

According to the present invention, the die-molded part of the door weather strip connects the first and second extrusion-molded parts on the corner part, and has the tabular-shaped rigid member embedded. The body of the rigid member has the single anchoring part, which protrudes and is fit in the hole formed on the vertical side part of the frame of the door. This positions the die-molded part of the door weather strip relative to the door.

The body also has the protrusion provided below the anchoring part, which protrudes from the body of the rigid member. The protrusion is flush with the body and extends toward the front part of the automobile body. The protrusion is capable of abutting with the second retainer. This prevents misalignment of the die-molded part of the door weather strip toward the rear part of the automobile body relative to the door. In other words, the protrusion, which abuts with the second retainer, would prevent misalignment of the die-molded part of the door weather strip if the die-molded part is misaligned toward the rear part relative to the door when the door is opened or closed.

This prevents abrasion or damage of the door weather strip due to an unexpected contact as well as an insufficient sealing performance, to stabilize the sealing performance.

In addition to the protrusion, the second rear seal lip has the thick part provided, which is provided close to the second retainer and capable of making elastic contact with the second retainer. This further prevents misalignment of the die-molded part of the door weather strip toward the rear part relative to the door.

In addition, the thick part is formed by die molding and covers the protrusion from the front side part. The thick part which covers the protrusion, not the protrusion, makes elastic contact with the second retainer directly under the misalignment of the die-molded part of the door weather strip toward the rear part relative to the door and cushions the protrusion. This prevents noise from abutment, which generates when the protrusion abuts with the second retainer directly.

DETAILED DESCRIPTION

Figure 1:
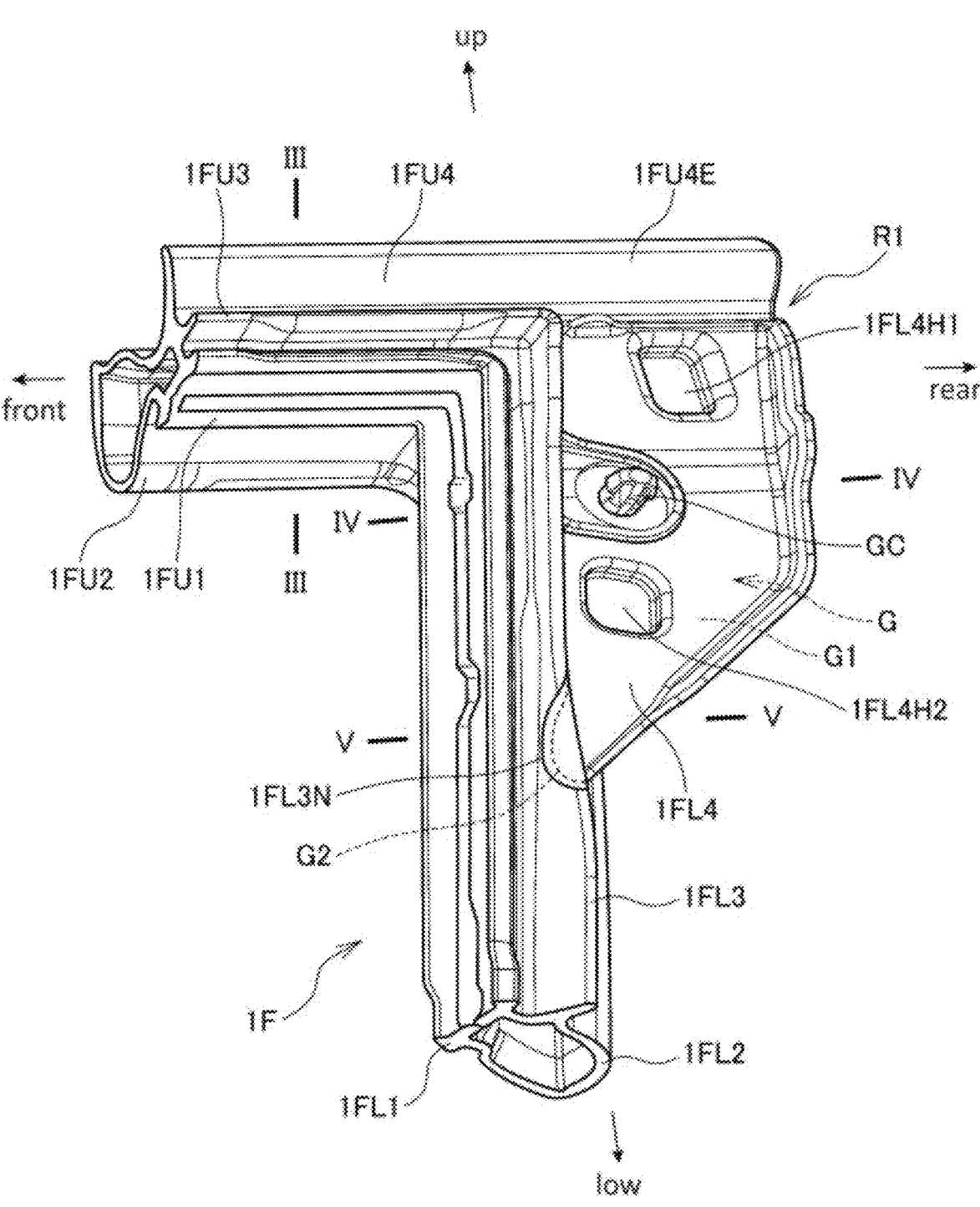
FIG. 1 is an enlarged perspective view of the main components of a coupling structure according to an embodiment of the present invention of a door weather strip for use on a left side door as viewed from the exterior of the automobile.

Referring to the Drawings, a coupling structure according to an embodiment of the present invention of a door weather strip 1, which couples to a front door 110 of an automobile 100, will be described. The door weather strip 1 couples to a rear door 210 as well, but detailed explanation is omitted. When constituents or items correspond to those in the related art, the same symbols are used.

Figure 2:
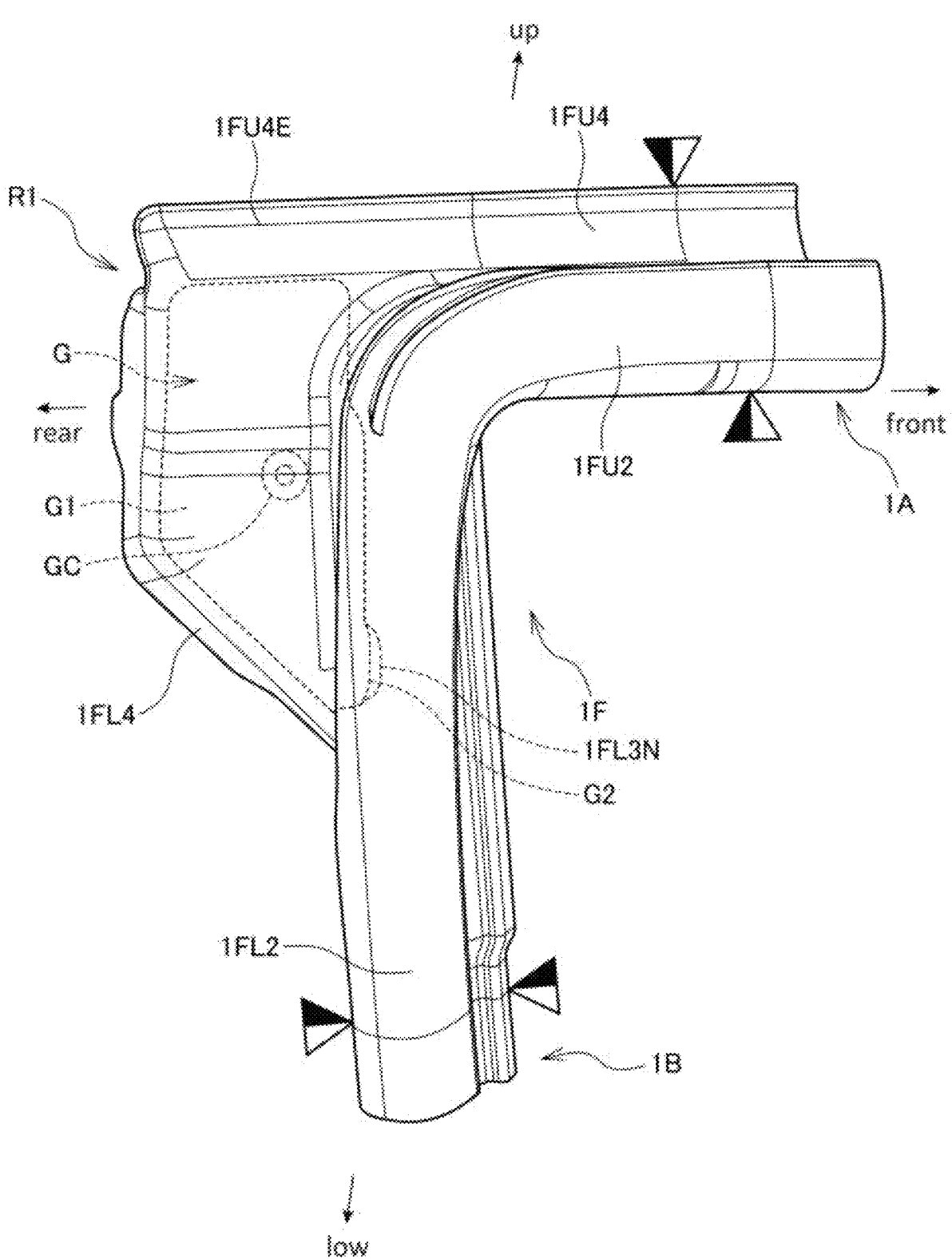
FIG. 2 is an enlarged perspective view of the main components of the coupling structure according to the embodiment of the present invention of the door weather strip for use on the left side door as viewed from the interior of the automobile.
Figure 9:
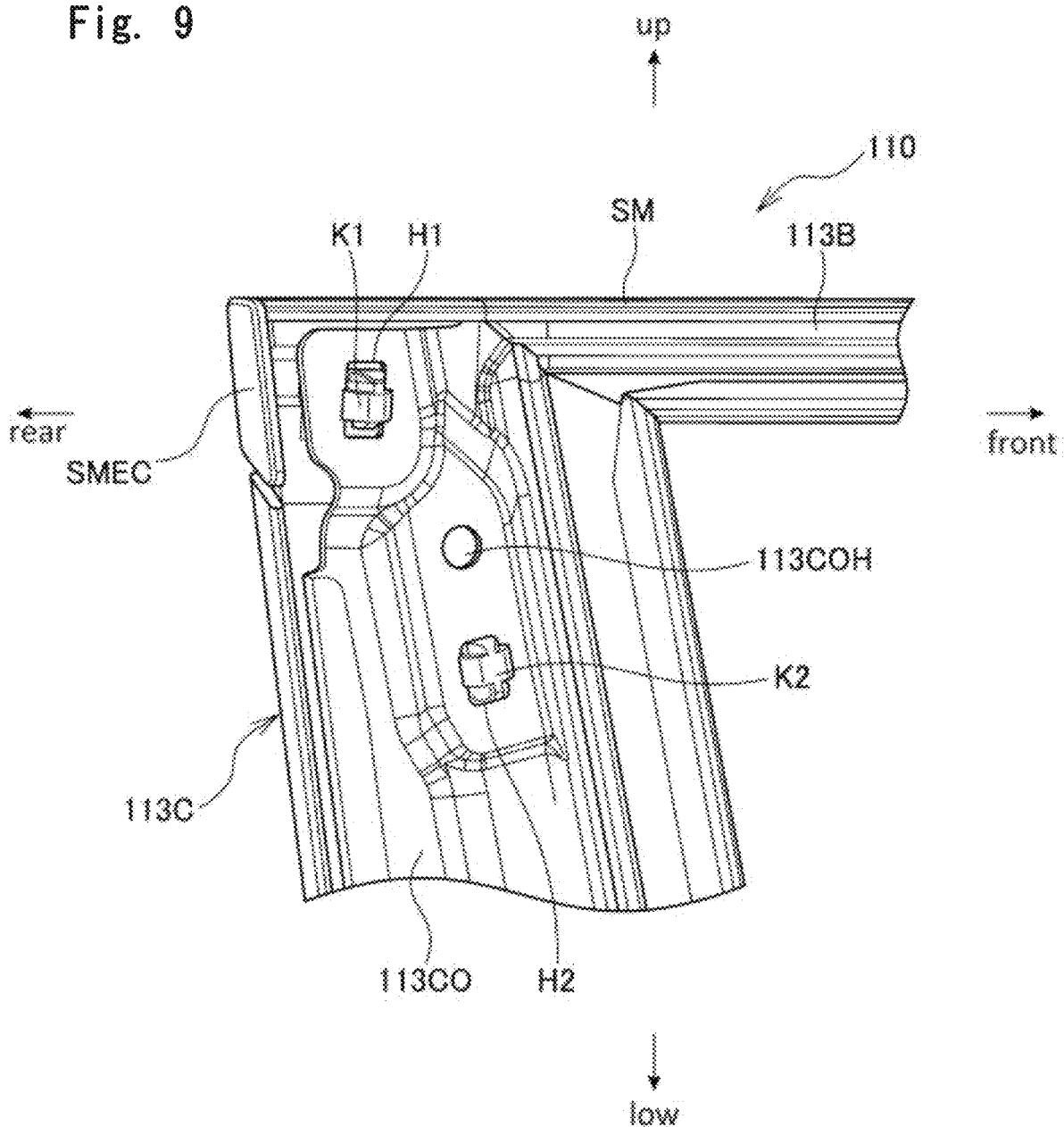
FIG. 9 is an enlarged perspective view of the structure of the left side door, to which the door weather strip according to the embodiment of the present invention for use on the left side door couples.
Figure 10:
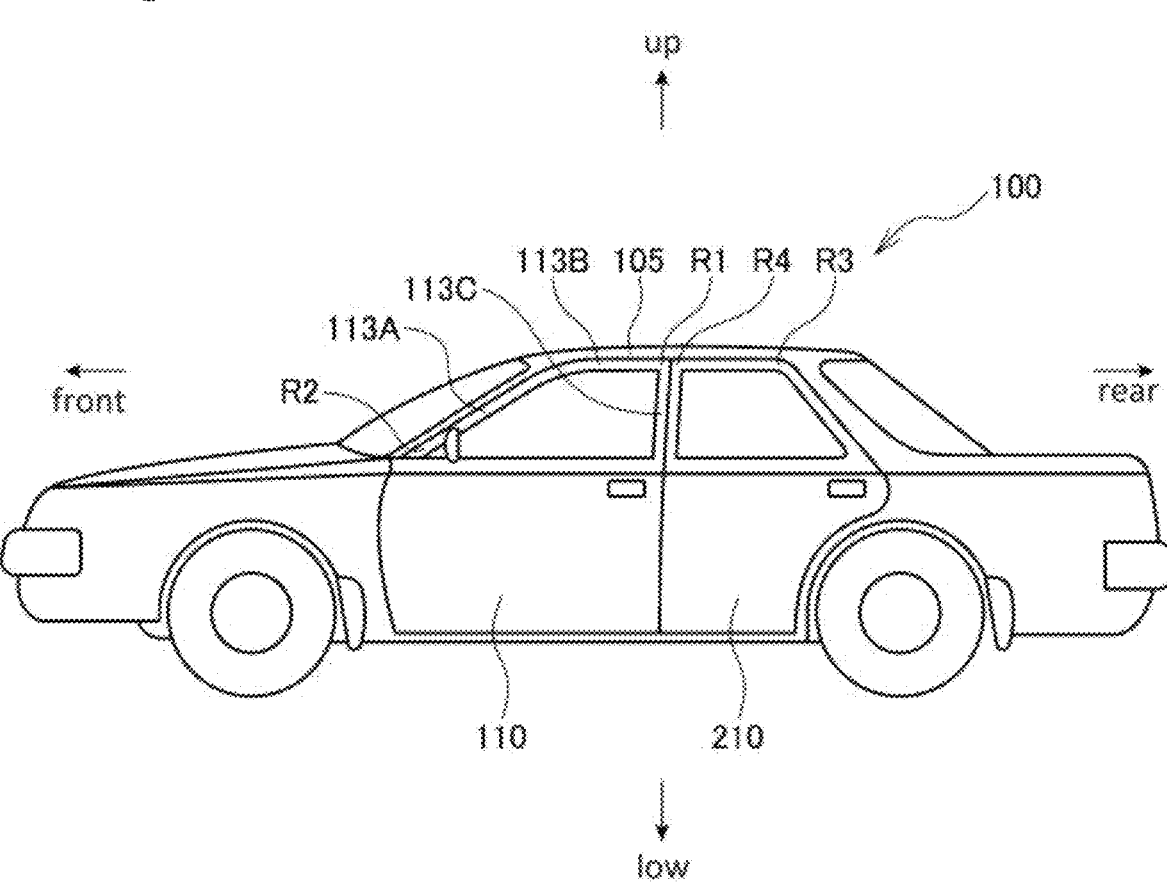
FIG. 10 is a side view of the left side of the automobile.
Figure 11A:
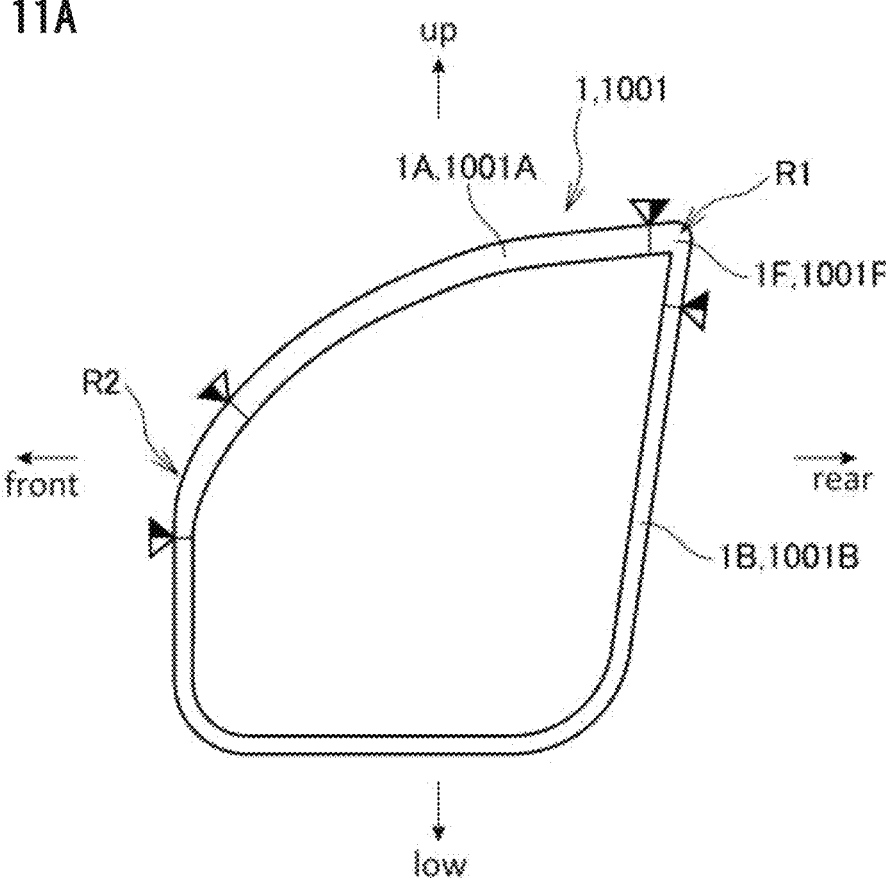
FIG. 11A is an enlarged side view of a door weather strip which couples to a front door of the automobile illustrated in FIG. 10.
Figure 11B:
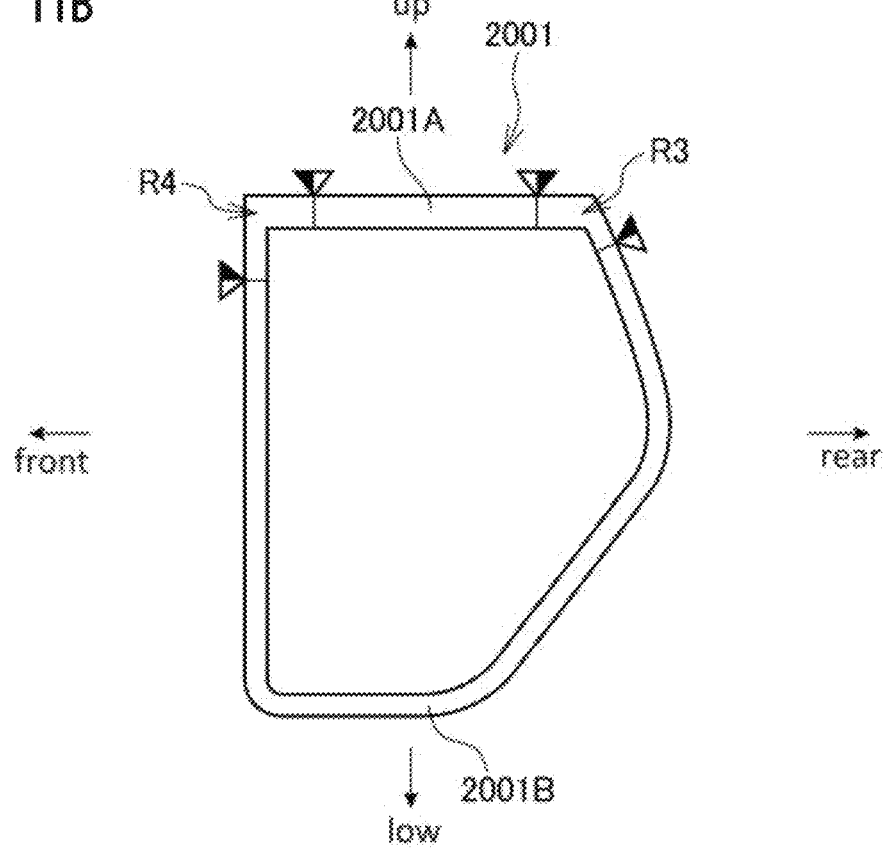
FIG. 11B is an enlarged side view of a door weather strip which couples to a rear door.
Figures 12A, 12B:
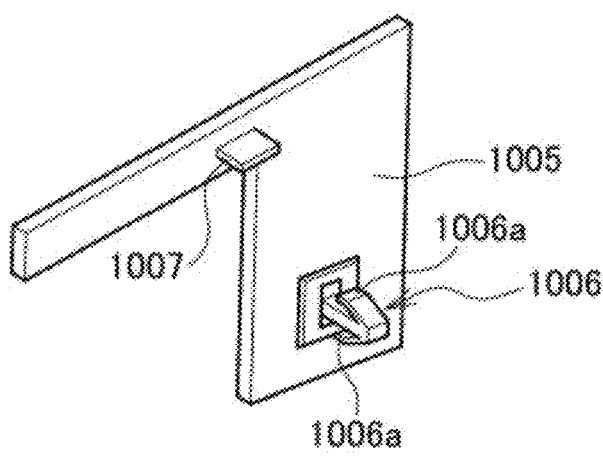
FIG. 12A is an enlarged perspective view of a die-molded part as the main component of a conventional coupling structure of a door weather strip.
FIG. 12B is an enlarged perspective view of an insert illustrated in FIG. 12A.

As illustrated in FIGS. 9, 11A, 11B, the door weather strip 1 includes a first extrusion-molded part 1A, a second extrusion-molded part 1B, and a die-molded part 1F. The first extrusion-molded part 1A couples to a front vertical side part 113A and an upper side part 113B of a frame of the front door 110. The second extrusion-molded part 1B couples to a vertical side part 113C of the frame. The die-molded part 1F connects the first and second extrusion-molded parts 1A, 1B on a corner part R1 at the rear end of an upper part of the front door 110. The upper side part 113B is provided between the upper end of the front vertical side part 113A and the upper end of the vertical side part 113C. In FIGS. 2, 11A, 11B, a black side part of black-white triangles shows the die-molded part, die-molded part 1F in this embodiment, and a white side part shows the extrusion-molded part, first and second extrusion-molded parts 1A, 1B in this embodiment.

Figure 3:
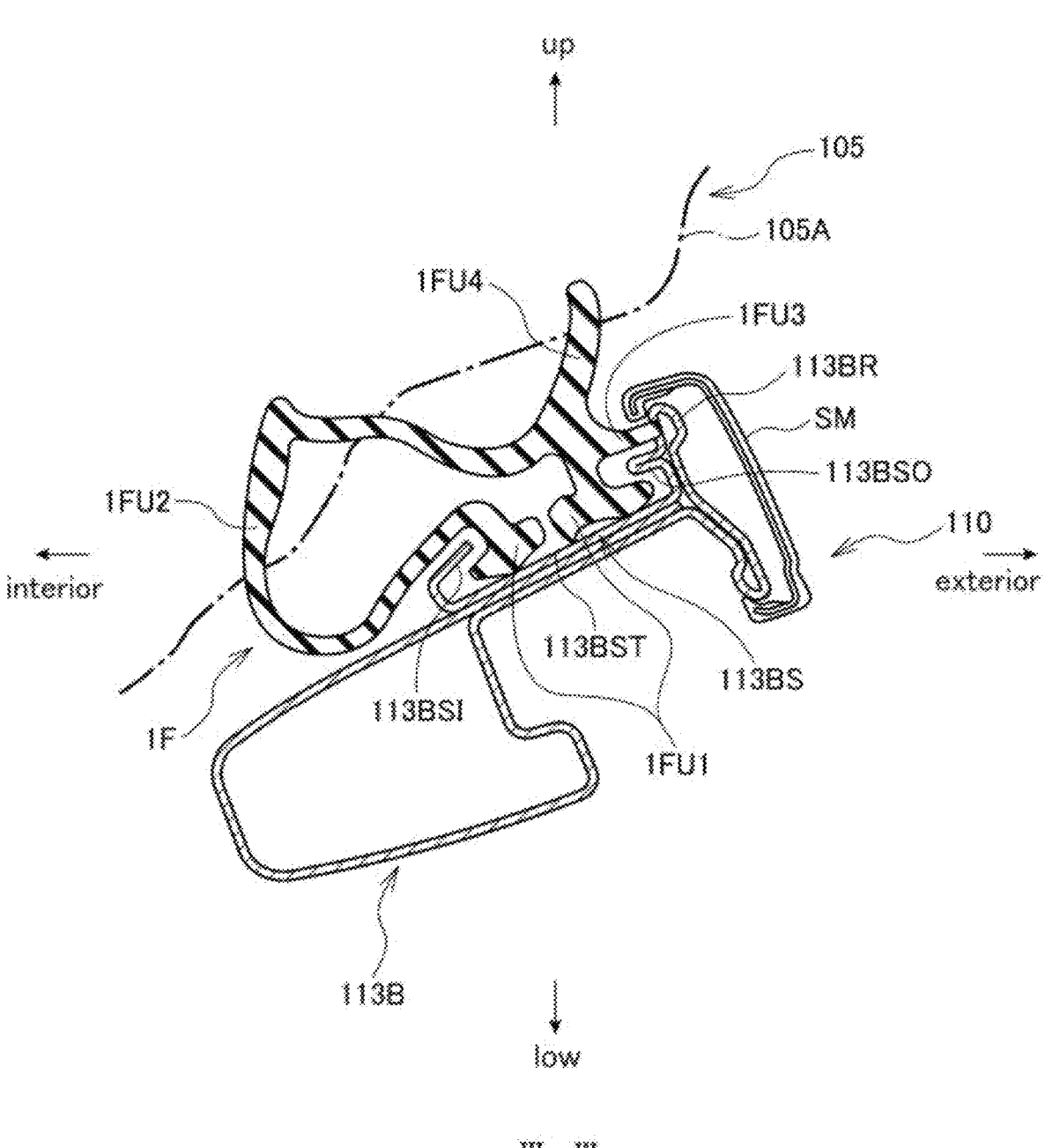
FIG. 3 is an enlarged cross-sectional view of the door weather strip according to the embodiment of the present invention take along line III-III of FIG. 1 with the door weather strip coupling to a door.

As illustrated in FIGS. 1, 2, 3, a first part of the die-molded part 1F closer to the upper side part 113B includes a first installation member 1FU1, a first hollow seal member 1FU2, a first sub seal lip 1FU4, and a first rear seal lip 1FU3. The first installation member 1FU1 couples to a first retainer 113BS of the front door 110. The first hollow seal member 1FU2 extends from the first installation member 1FU1 and seals a gap between a peripheral edge 105A of a door opening of an automobile body 105 of the automobile 100 and the front door 110. The first sub seal lip 1FU4 extends from at least one of the first hollow seal member 1FU2 or the first installation member 1FU1 and makes elastic contact with the peripheral edge 105A. The first rear seal lip 1FU3 extends from a space between the first installation member 1FU1 and the first sub seal lip 1FU4, and makes elastic contact with a vertical part 113BR of the upper side part 113B. The first installation member 1FU1 has a slit, from which a core (illustration omitted) used for die molding is inserted, and is fixed into a space surrounded by an installation surface 113BST, an inner part 113BSI, and an outer part 113BSO of the first retainer 113BS.

Figure 4:
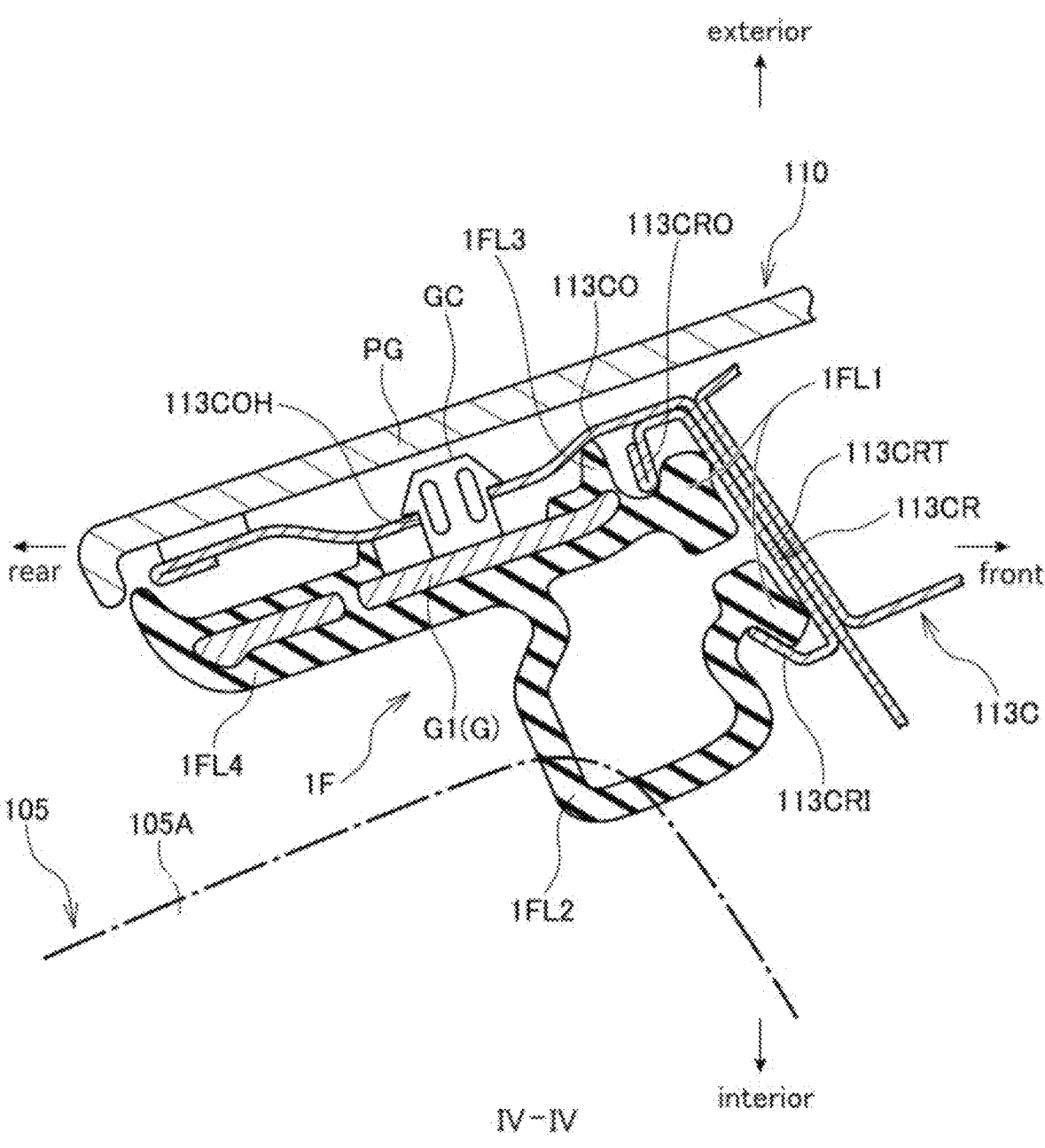
FIG. 4 is an enlarged cross-sectional view of the door weather strip according to the embodiment of the present invention take along line IV-IV of FIG. 1 with the door weather strip coupling to the door.

As illustrated in FIGS. 1, 2, 4, a second part of the die-molded part 1F closer to the vertical side part 113C includes a second installation member 1FL1, a second hollow seal member 1FL2, and a second rear seal lip 1FL3. The second installation member 1FL1 couples to a second retainer 113CR of the front door 110. The second hollow seal member 1FL2 extends from the second installation member 1FL1 and seals a gap between the peripheral edge 105A and the front door 110. The second rear seal lip 1FL3 extends from the second installation member 1FL1 and makes elastic contact with the rear surface 113CO of the vertical side part 113C.

The second installation member 1FL1 has a slit, from which the core is inserted, and is fixed into a space surrounded by an installation surface 113CRT, an inner part 113CRI, and an outer part 113CRO of the second retainer 113CR.

As illustrated in FIGS. 1, 2, a first extended part 1FU4E extends toward the rear part of the corner part R1, that is toward the rear part of the automobile body 105 (toward the rear door 210), from the first sub seal lip 1FU4. A second extended part 1FL4 extends toward the rear part of the corner part R1 as well from a connecting part between the second installation member 1FL1 and the second hollow seal member 1FL2 closer to the exterior of the automobile. The lower end of the first extended part 1FU4E and the upper end of the second extended part 1FL4 are connected.

As illustrated in FIGS. 1, 2, 4, 5, the second extended part 1FL4 has a rigid member G embedded. The rigid member G has a tabular shape.

The rigid member G is made of resin and includes a body G1. Alternatively, the rigid member G may be made of metal. The body G1 has a single anchoring part GC at the center. The anchoring part GC is a clip and protrudes toward the exterior of the automobile. When the door weather strip 1 couples to the front door 110, the anchoring part GC is fit in a hole 113COH formed on the vertical side part 113C opposite the anchoring part GC as illustrated in FIGS. 4, 9.

In this embodiment, the vertical side part 113C has a first hole H1 formed above the hole 113COH as illustrated in FIGS. 3, 9, and a second hole H2 formed below the hole 113COH as illustrated in FIGS. 4, 9. A first clip K1, which protrudes from an end cap SMEC of a sash molding SM, is fit in the first hole H1. A second clip K2, which protrudes from a pillar garnish PG, is fit in the second hole H2. As illustrated in FIG. 9, the first and second holes H1, H2 are close to each other and limit the space. It causes formation of only the single hole 113COH between the holes H1, H2. This leads to formation of the single anchoring part GC, which protrudes from the rigid member G in the second extended part 1FL4 as illustrated in FIGS. 1, 4.

Also, formation of concave-shaped parts 1FL4H1, 1FL4H2 as illustrated in FIG. 1 on parts of the second extended part 1FL4 opposite the first and second clips K1, K2 indicates the limited space between the first and second holes H1, H2. The concave-shaped parts 1FL4H1, 1FL4H2 are used to keep the first and second clips K1, K2 away from the door weather strip 1.

As illustrated in FIGS. 1, 2, a protrusion G2 is provided below the anchoring part GC. The protrusion G2 is flush with the body G1 and extends toward the front part of the automobile body 105.

Figure 5:
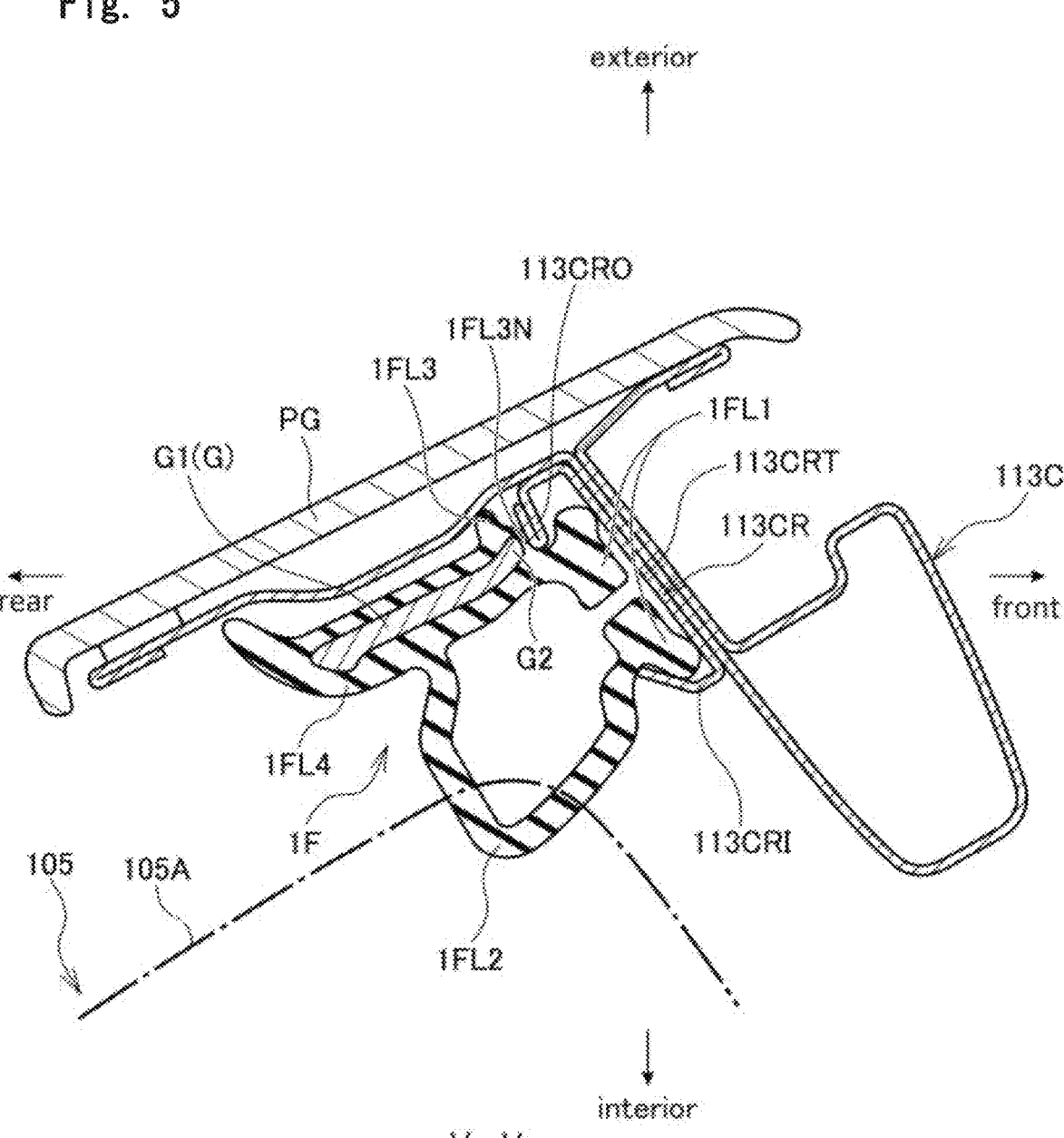
FIG. 5 is an enlarged cross-sectional view of the door weather strip according to the embodiment of the present invention taken along line V-V of FIG. 1 with the door weather strip coupling to the door.

In addition, the second rear seal lip 1FL3 has a thick part 1FL3N provided below the anchoring part GC as illustrated in FIG. 5.

Figure 6:
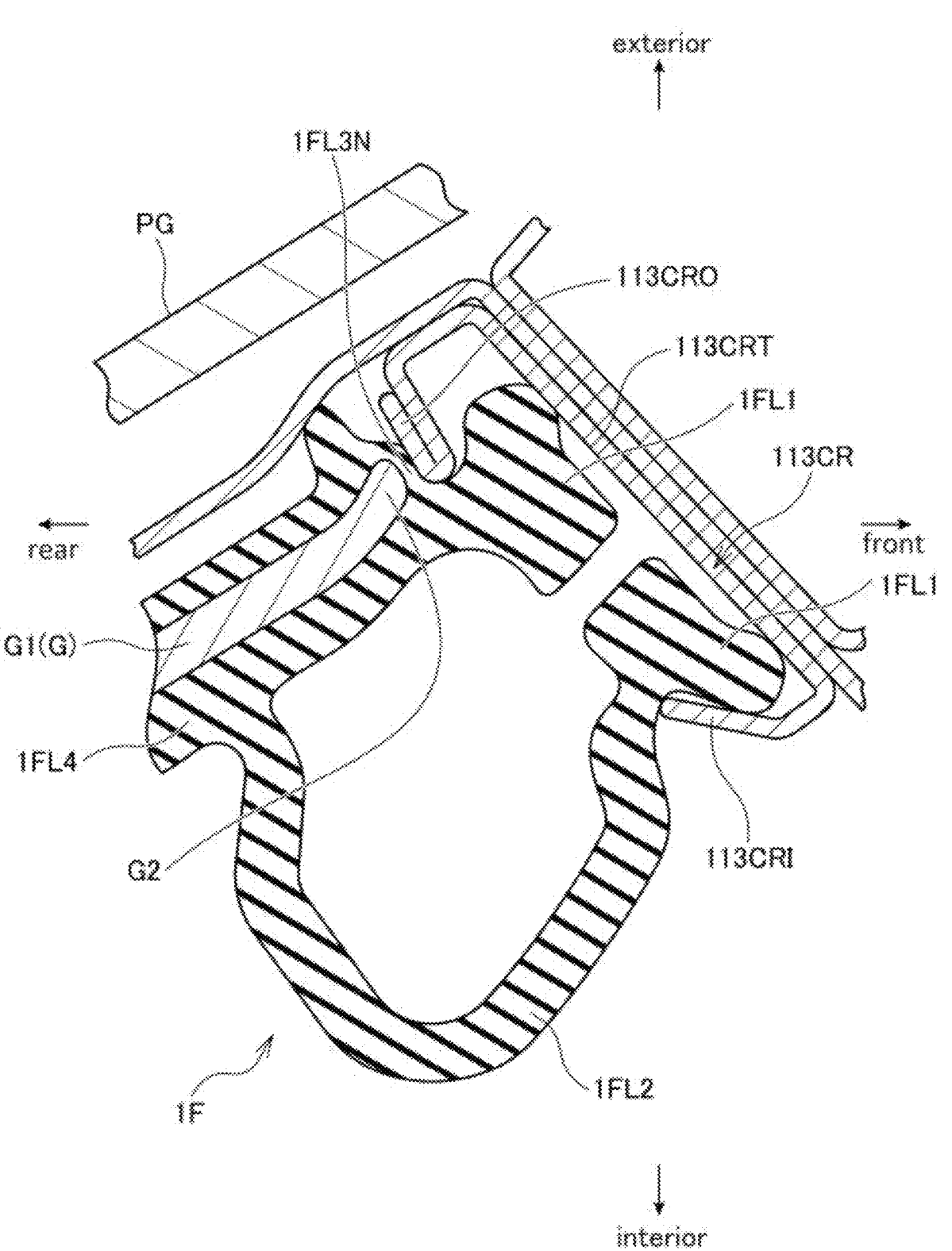
FIG. 6 is an enlarged cross-sectional view of the main components of FIG. 5.

The thick part 1FL3N is formed by die molding and covers the protrusion G2 from the front side part as illustrated in FIG. 6. The thick part 1FL3N is provided close to the outer part 113CRO and is capable of making elastic contact with the outer part 113CRO (the thick part 1FL3N in FIG. 5, which is taken along line V-V in FIG. 1, is closer to the outer part 113CRO than in FIG. 4, which is taken along line IV-IV in FIG. 1).

In this embodiment, the thick part 1FL3N directly makes elastic contact with the outer part 113CRO as illustrated in FIG. 6. Alternatively, the thick part 1FL3N may be provided close to the outer part 113CRO with slight distance, and come into contact only under misalignment of the die-molded part 1F relative to the front door 110. Rubber like elastic body is usable as the first extrusion-molded part 1A, the second extrusion-molded part 1B, and the die-molded part 1F. Alternatively, EPDM sponge rubber of rubber material or soft thermoplastic olefinic elastomer (TPO) of thermoplastic elastomer (TPE) is preferably used. Also, hard resin or metal is usable as the rigid member G, but hard resin, which is easier to mold, is more preferable.

As illustrated in FIGS. 1, 4, 5, 6, 9, the die-molded part 1F of the coupling structure connects the first and second extrusion-molded parts 1A, 1B on the corner part R, and has the tabular-shaped rigid member G embedded. The body G1 has the anchoring part GC, which protrudes and is fit in the hole 113COH. This positions the die-molded part 1F on the front door 110.

The body G1 also has the protrusion G2 provided below the anchoring part GC. The protrusion G2 is flush with the body G1 and extends toward the front part. In addition, the thick part 1FL3N covers the protrusion G2 from the front side part, is provided close to the second retainer 113CR, and is capable of making elastic contact with the second retainer 113CR. This prevents misalignment of the die-molded part 1F toward the rear part of the automobile body 105 relative to the front door 110. More specifically, the thick part 1FL3N, which covers and wraps the protrusion G2, would make elastic contact with the outer part 113CRO, to prevent misalignment of the die-molded part F1 if the die-molded part F1 is misaligned toward the rear part relative to the front door 110 when the front door 110 is opened or closed. The misalignment arises when force moves or rotates an upper side part of the die-molded part 1F above the anchoring part GC toward the rear part and a lower side part of the die-molded part 1F below the anchoring part GC toward the front part with the anchoring part GC at the center of rotation.

This prevents abrasion or damage of the door weather strip 1 due to an unexpected contact, for example the door weather strip 1 comes into contact with the rear door 210 when the front door 110 is opened or closed, as well as an insufficient sealing performance of the door weather strip 1, to stabilize the sealing performance.

Figure 7:
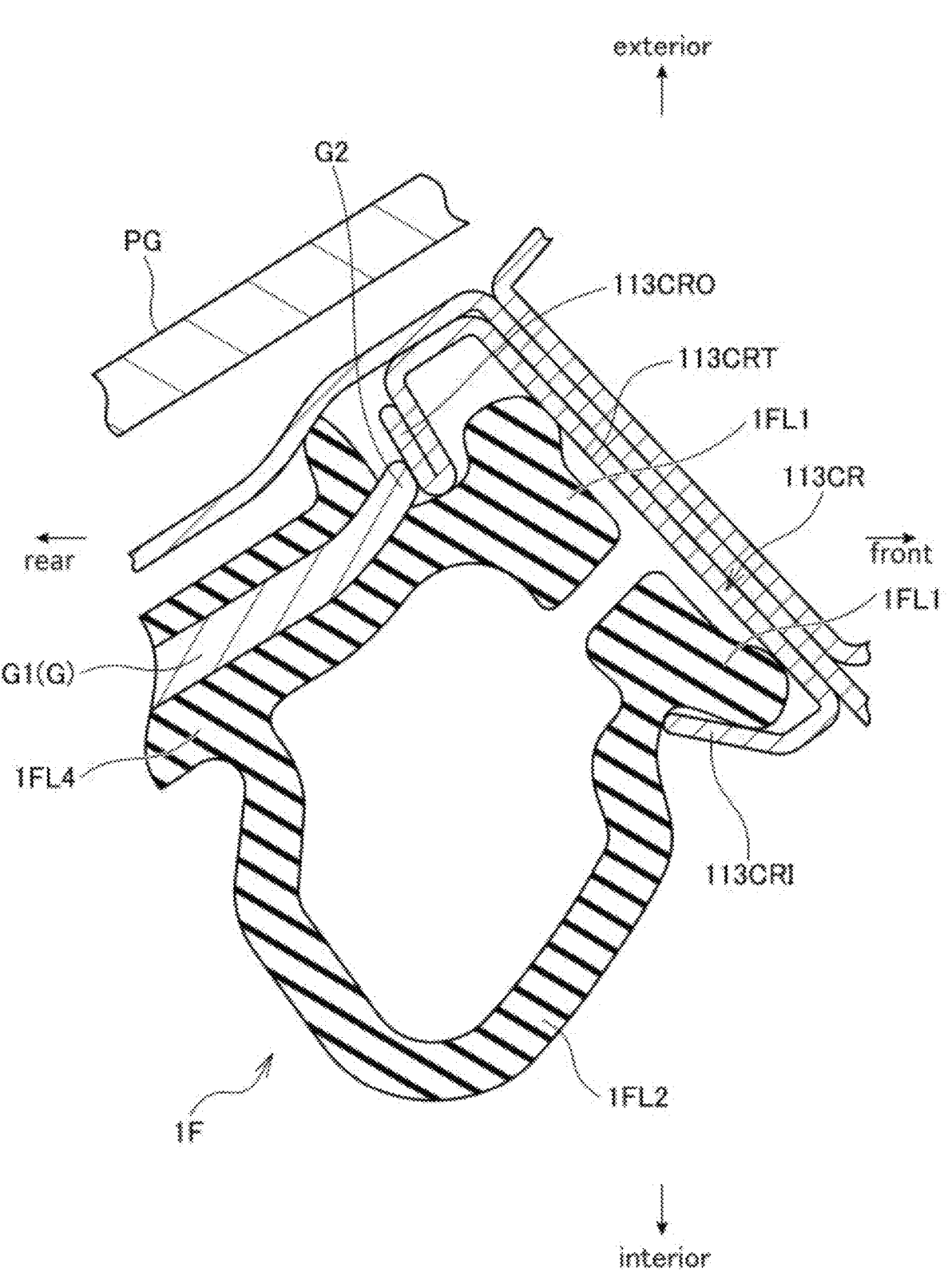
FIG. 7 is an enlarged cross-sectional view of the main components of FIG. 5 according to another embodiment of the present invention.

In this embodiment, the thick part 1FL3N covers the protrusion G2. Alternatively, the thick part 1FL3N may be omitted, such that the protrusion G2 is capable of abutting with (touching) the outer part 113CRO as illustrated in FIG. 7. In this modification, the protrusion G2 abuts with the outer part 113CRO under the misalignment of the die-molded part F1 toward the rear part relative to the front door 110, to control the misalignment.

Figure 8:
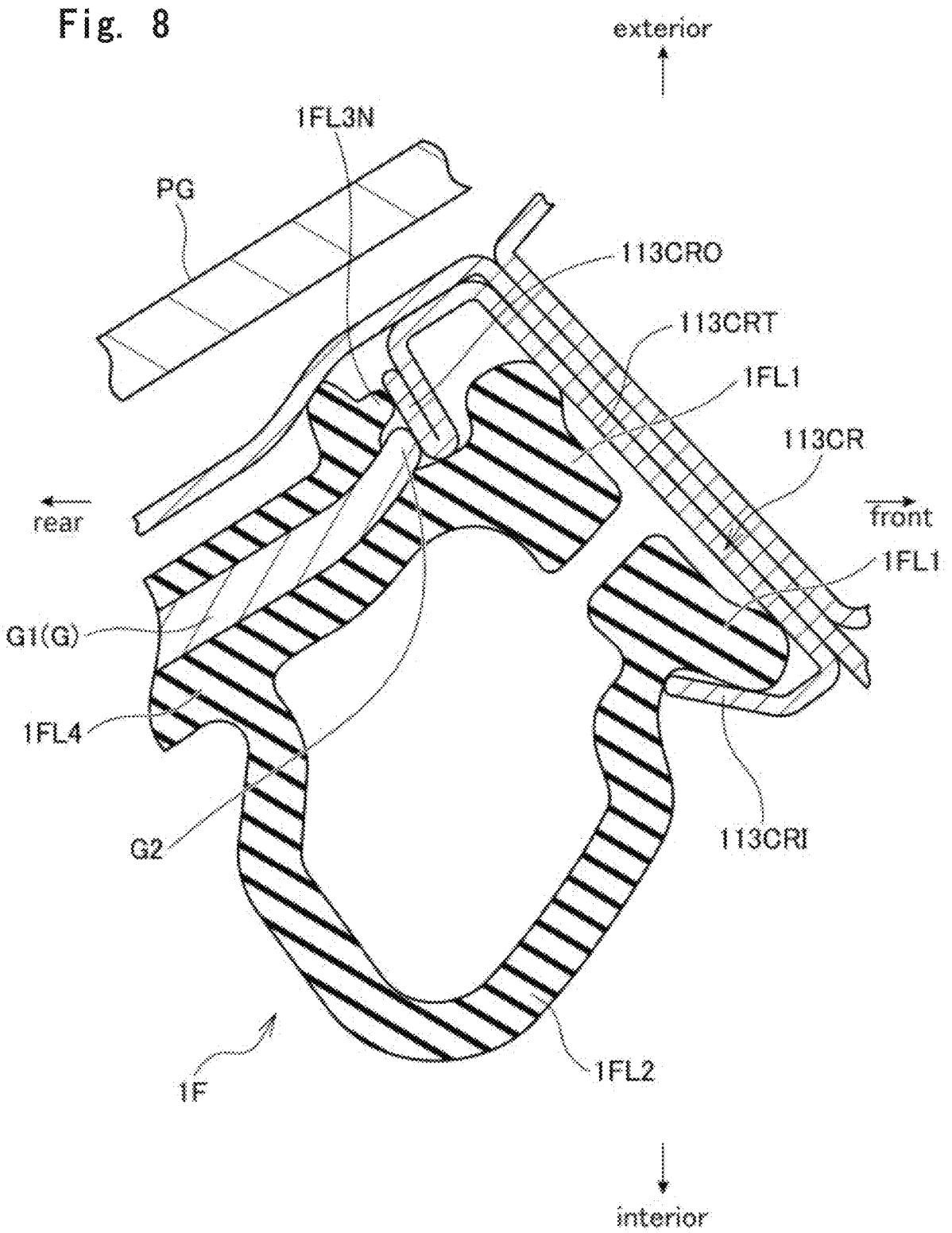
FIG. 8 is an enlarged cross-sectional view of the main components of FIG. 5 according to still another embodiment of the present invention.

Alternatively, the protrusion G2 and the thick part 1FL3N may be provided separately as illustrated in FIG. 8. In this modification, the protrusion G2 abuts with the outer part 113CRO and the thick part 1FL3N makes elastic contact with the outer part 113CRO separately under the misalignment of the die-molded part F1 toward the rear part relative to the front door 110, to control the misalignment.

The thick part 1FL3N of the embodiment illustrated in FIG. 6 is formed by die molding and covers the protrusion G2 from the front side part. The thick part 1FL3N, which covers the protrusion G2, not the protrusion G2 itself, makes elastic contact with the outer part 113CRO directly under the misalignment of the die-molded part 1F toward the rear part and cushions the protrusion G2. This configuration, among the embodiments illustrated in FIGS. 6, 7, 8, prevents noise from abutment, which generates when the protrusion G2, made of resin or metal, abuts with the outer part 113CRO directly as illustrated in FIG. 7.

This embodiment is effective to the configuration with the single hole 113COH, in which the anchoring part GC is fit, formed on the vertical side part 113C for example due to the limited space between the first and second holes H1, H2. In this embodiment, the structure is applied to the corner part R1 at the rear end of the upper part of the front door 110, but is applicable to a corner part R3 at the rear end of the upper part of the rear door 210 (illustration omitted).

I claim:

1. A coupling structure of a door weather strip, in which the door weather strip is coupled to a frame of a door of an automobile, the door weather strip comprising:

a first extrusion-molded part configured to be operably coupled to an upper side part of the frame;

a second extrusion-molded part configured to be operably coupled to a vertical side part of the frame; and a die-molded part configured to connect the first and second extrusion-molded parts at a corner part;

wherein the die-molded part includes a first part closer to the upper side part, the first part comprising:

a first installation member configured to be operably coupled to a first retainer of the door;

a first hollow seal member which extends from the first installation member, the first hollow seal member being configured to seal a gap between a peripheral edge of a door opening of an automobile body of the automobile and the door;

a first sub seal lip which extends from at least one of the first hollow seal member or the first installation member, the first sub seal lip being configured to make elastic contact with the peripheral edge of the door opening; and a first extended part which extends toward a rear part of the corner part from the first sub seal lip;

wherein the die-molded part includes a second part of closer to the vertical side part, the second part comprising:

a second installation member configured to be operably coupled to a second retainer of the door;

a second hollow seal member which extends from the second installation member, the second hollow seal member being configured to seal a gap between the peripheral edge of the door opening and the door;

a second rear seal lip which extends from the second installation member, the second rear seal lip being configured to make elastic contact with a rear surface of the vertical side part; and a second extended part which extends toward the rear part of the corner part from a connecting part between the second installation member and the second hollow seal member closer to the exterior of the automobile, a lower end of the first extended part and an upper end of the second extended part being connected, and the second extended part having a rigid member embedded therein;

wherein the rigid member has a tabular shape, the rigid member having more rigidity than the second rear seal lip, the rigid member including a body, and the body comprising:

a single anchoring part which protrudes from the body of the rigid member, the anchoring part being configured to be fit in a hole formed on the vertical side part;

a protrusion provided below the anchoring part, the protrusion being provided on the body and flush with the body, the protrusion extending toward a front part of the automobile body, and the protrusion being capable of abutting with an outer part of the second retainer;

wherein the second rear seal lip has a thick part provided below the anchoring part, the anchoring part protrudes from the body of the rigid member, and the thick part is provided close to the outer part of the second retainer and is capable of making elastic contact with the outer part; and wherein the thick part is formed by die molding and covers the protrusion from a front side part.

\* \* \* \* \*